United States Patent [19]

Eckell et al.

[11] 4,251,653

[45] Feb. 17, 1981

[54] MANUFACTURE OF NYLON BY ADDING LIQUID DIAMINE TO AQUEOUS POLYAMIDE FORMING SALT SOLUTION

[75] Inventors: Albrecht Eckell, Frankenthal; Paul Matthies, Heidelberg; Georg Pilz, Neustadt; Rudi-Heinz Rotzoll, Limburgerhof, all of Fed. Rep. of Germany

[73] Assignee: BASF Aktiengesellschaft, Fed. Rep. of Germany

[21] Appl. No.: 913,748

[22] Filed: Jun. 8, 1978

[30] Foreign Application Priority Data

Jun. 27, 1977 [DE] Fed. Rep. of Germany ....... 2728931

[51] Int. Cl.³ .............................................. C08G 69/28
[52] U.S. Cl. .............................. 528/335; 260/29.2 N; 526/65; 526/66; 528/346
[58] Field of Search ...................... 528/335; 526/65, 66

[56] References Cited

U.S. PATENT DOCUMENTS

| | | | |
|---|---|---|---|
| 2,923,699 | 2/1960 | Indest et al. | 528/335 |
| 3,185,672 | 5/1965 | Clemo et al. | 528/335 |
| 3,952,051 | 4/1976 | Ogawa et al. | 260/501.2 |
| 4,131,712 | 12/1978 | Sprauer | 528/335 |

FOREIGN PATENT DOCUMENTS 674954 7/1952 United Kingdom .
1018653 1/1966 United Kingdom .
1159151 7/1969 United Kingdom .

*Primary Examiner*—Harold D. Anderson
*Attorney, Agent, or Firm*—Keil & Witherspoon

[57] ABSTRACT

A process for the manufacture of nylons by heating an aqueous solution of a salt of an alkanedicarboxylic acid of 6 to 12 carbon atoms and a diamine of the formula $NH_2RNH_2$, where R is alkylene of 6 to 12 carbon atoms or is a radical

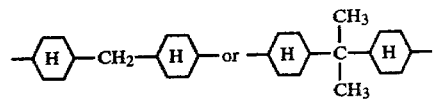

to a temperature at which a nylon is formed, under superatmospheric pressure and with removal of water. The solution used is an aqueous solution of from 75 to 90 percent strength by weight of a salt of a dicarboxylic acid and a diamine, which solution has been obtained by neutralizing a less concentrated salt solution, which contains an appropriate dissolved excess of the particular dicarboxylic acid, with the corresponding diamine. The nylons obtained are used for the manufacture of moldings.

6 Claims, No Drawings

MANUFACTURE OF NYLON BY ADDING LIQUID DIAMINE TO AQUEOUS POLYAMIDE FORMING SALT SOLUTION

The present invention relates to a process for the manufacture of a nylon by heating an aqueous solution of a salt of a dicarboxylic acid and a diamine to a temperature at which a nylon is formed, under superatmospheric pressure, with removal of water.

In the conventional industrial manufacture of nylons by condensing a salt of a diamine and a dicarboxylic acid, e.g. hexamethylenediammonium adipate, the starting material is, as a rule, an aqueous solution of such a salt. As disclosed in British Pat. No. 674,954, German Pat. No. 1,060,139 and German Published Application DAS No. 1,158,257, aqueous salt solutions of from 45 to 70% strength by weight are used as a rule. However, before the actual polycondensation, the greater part of the excess water must be removed from such solutions by a pre-evaporator stage, for example to reduce the water content to from 30 to 10% by weight. This means that it is first necessary to heat the aqueous salt solution used and to evaporate excess water, which requires substantial amounts of energy, before the actual condensation can be carried out.

Attempts have also already been made to overcome these disadvantages by using molten adipic acid and liquid hexamethylenediamine as starting materials, as is disclosed in British Pat. No. 1,018,653 and Belgian Pat. No. 640,369. The use of molten starting materials presents substantial problems in connection with metering and rapid mixing. In addition, molten adipic acid tends to undergo decarboxylation, and also tends to form adipic anhydride.

It is an object of the present invention to avoid having to evaporate large amounts of water when manufacturing nylons, but also to avoid the difficulties of metering molten liquid starting materials.

We have found that this object is achieved by providing a process for the manufacture of a nylon by heating an aqueous solution of a salt of an alkanedicarboxylic acid of 6 to 12 carbon atoms and a diamine of the formula NH$_2$RNH$_2$, where R is alkylene of 6 to 12 carbon atoms or is the radical

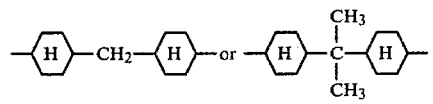

to a temperature at which a nylon is formed, under superatmospheric pressure and with removal of water, wherein the solution used is an aqueous solution of from 75 to 90 percent strength by weight of a salt of such a dicarboxylic acid and such a diamine, which solution has been obtained by neutralizing a less concentrated salt solution, which contains an appropriate dissolved excess of the particular dicarboxylic acid, with the corresponding diamine.

The novel process has the advantage that substantially less water needs to be evaporated during polycondensation, which means that smaller apparatus can be used. In addition, the process needs less energy because it utilizes the heat of neutralization. Furthermore, a concentrated solution of the above salt is more easily handled than molten starting materials.

In view of page 4 of German Laid-Open Application DOS No. 2,403,178, it did not appear possible to use very concentrated solutions of salts of dicarboxylic acids and diamines, since difficulties, for example due to degradation of the salt, were to be expected.

The acid starting material used is an alkanedicarboxylic acid of 6 to 12 carbon atoms. α, ω-Straight-chain alkanedicarboxylic acids having the above number of carbon atoms are particularly suitable. Examples include adipic acid, suberic acid, azelaic acid, decanedicarboxylic acid and dodecanedicarboxylic acid. Adipic acid, sebacic acid and dodecanedicarboxylic acid are industrially particularly important.

The diamine used has the formula NH$_2$RNH$_2$, where R is alkylene of 6 to 12 carbon atoms or is

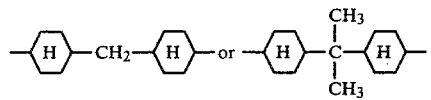

The use of an alkanediamine of 6 to 12 carbon atoms, especially of an α, ω-straight-chain alkanediamine, is preferred. Examples of suitable diamines are hexamethylenediamine, octamethylenediamine, decamethylenediamine, dodecamethylenediamine, 2,2-(4',4"-diaminodicyclohexyl)-propane and 4,4'-diaminodicyclohexylmethane. Hexamethylenediamine is industrially particularly important.

The initial starting material is a less concentrated aqueous solution of a salt of a dicarboxylic acid and a diamine. Such a solution as a rule contains from 40 to 65% by weight of the particular salt. in one preferred embodiment, additional dicarboxylic acid, in the amount required to give the desired final concentration of salt, is dissolved in such a salt solution. Advantageously, the dicarboxylic acid is dissolved at from 60° to 110° C. The resulting salt solution, containing free dicarboxylic acid, is then neutralized with the appropriate diamine, advantageously in the molten form.

In another preferred embodiment, solid (crystalline) dicarboxylic acid is mixed with less than an equivalent amount of an aqueous solution of a diamine, i.e. using an excess of the dicarboxylic acid. This in the first instance gives a salt solution of lower concentration, e.g. of from 40 to 65% strength by weight, based on salt plus water, which solution additionally contains dissolved excess dicarboxylic acid. As a rule, this solution is prepared at from 60° to 110° C. The resulting solution is then neutralized with diamine, advantageously in the molten form, as described above.

Neutralization may be effected, for example, in mixing zones which contain baffles to achieve rapid mixing; advantageously, not all the diamine required for neutralization is first added, and instead a first mixing is carried out, the pH is determined, and the final adjustment is then made by adding further diamine.

For the purposes of the invention, neutralization means reaching the equivalence point of the particular salt of a diamine and a dicarboxylic acid. For example, this point is at pH 7.62 for hexamethylenediammonium adipate, and at 7.5 for hexamethylenediammonium sebacate (measured, after dilution, in 10% strength by weight aqueous solution at 25° C.). Obviously, the amount of diamine added is equivalent to the amount of dicarboxylic acid, but a slight excess, e.g., up to 1 mole %, may or may not be added to compensate for diamine losses during condensation.

The neutralization is advantageously carried out in the absence of molecular oxygen, for example under an inert gas.

The heat liberated during neutralization raises the temperature of the reaction mixture. Advantageously, the final temperature during neutralization is kept at from 140° to 210° C., especially from 170° to 200° C. As a rule, the neutralization is carried out under superatmospheric pressure, e.g. at from 2 to 15 bars.

The resulting solution of the salt of the dicarboxylic acid and diamine is required to be of from 75 to 90% strength by weight for use in the process according to the invention, a strength of from 80 to 85% by weight being particularly preferred. Solutions of hexamethylenediammonium adipate, of the above concentration, have attained particular importance.

The resulting highly concentrated solution of a salt of a dicarboxylic acid and a diamine may be condensed in the conventional manner to give a nylon. The condensation is carried out at a temperature at which a nylon is formed, as a rule at from 240° to 300° C., temperatures of from 260° to 290° C. being particularly preferred. The pressure employed is superatmospheric, in general up to 100 bars, and in particular pressures of from 20 to 80 bars have proved suitable. During condensation, such water as has been introduced with the salt solution, as well as the water of condensation, is removed. This may be done, for example, by removing the water stepwise during the condensation, but it is also possible, especially in a continuous process, to remove the water in the final stage, after the condensation.

Furthermore, regulators, e.g. lower fatty acids, stabilizers, antistatic agents and delustering agents may be added before, during or after the condensation.

The condensation process may be carried out batchwise but is advantageously carried out continuously. Suitable procedures are described, for example, in German Published Application DAS 1,495,087, British Pat. No. 1,159,151, German Pat. No. 1,060,139, British Pat. No. 674,954 and German Laid-Open Application DOS No. 2,417,003.

The nylons manufactured by the process of the invention may be used for producing shaped articles, e.g. filaments, fibers, moldings, sheets or coatings, from the melt.

The Example which follows illustrates the process of the invention. Percentages are by weight.

EXAMPLE 5,250 g of nylon salt (hexamethylenediammonium adipate) were dissolved in 3,450 g of water, in a 40 liter stirred autoclave, by heating at 95° C. 8,025 g of solid adipic acid were gradually added to the resulting 60.3% strength nylon salt solution at 90°–95° C., whilst stirring, and were dissolved therein. The autoclave was flushed with nitrogen and sealed. The contents were heated to 100° C., resulting in an autogenous pressure of 2 bars. 6,375 g of molten hexamethylenediamine at 100° C. were forced into the autoclave from a feed vessel by means of nitrogen pressure, in the course of 2 minutes, with the stirrer running. The temperature of the resulting 85% strength nylon salt solution rose as a result of the heat of neutralization liberated and reached 162° C. 2 minutes after adding the hexamethylenediamine. During the addition of the hexamethylenediamine the pressure transiently rose to 4 bars and fell, by the end of the addition, to 3 bars.

The nylon salt solution was polycondensed without prior cooling. It was heated to 275° C. in the course of 3½ hours, whilst keeping the pressure at 19 bars by blowing off steam. After reaching 275° C., the mixture was let down to atmospheric pressure in the course of 1 hour and was then post-condensed for 1 hour at 275° C. The product was forced out of the autoclave by nitrogen pressure and the strand of molten material was cooled in a waterbath and was granulated. The resulting nylon 6,6 had a relative viscosity of 2.54, measured in 1% strength solution in 96% strength sulfuric acid, and contained 54 milliequivalents/kg of acid groups and 76 milliequivalents/kg of basic groups.

Nylon 6,9 and nylon 10,6 were obtained by a similar method to that described above.

We claim:

1. In a process for the manufacture of nylon wherein an aqueous solution of a salt of an alkanedicarboxylic acid of 6 to 12 carbon atoms and a diamine of the formula NH$_2$RNH$_2$, where R is alkylene of 6 to 12 carbon atoms or is a radical

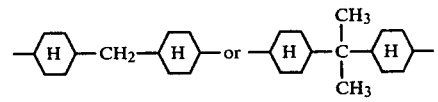

is heated to a temperature at which condensation occurs and nylon is formed, under superatmospheric pressure and with removal of water, the improvement which comprises: adding liquid diamine to the aqueous salt solution, said solution having a salt concentration of from 40 to 65% by weight and containing free alkanedicarboxylic acid, whereby the diamine neutralizes the free alkanedicarboxylic acid to form a salt solution having a concentration of from 75 to 90% by weight.

2. The process of claim 1 wherein the solution heated to form nylon is obtained by dissolving the appropriate amount of dicarboxylic acid in an aqueous salt solution of lower concentration and neutralizing the dicarboxylic acid with liquid diamine.

3. The process of claim 1 wherein the solution heated to form nylon is obtained by mixing a solid dicarboxylic acid with less than an equivalent amount of aqueous diamine and then neutralizing the excess dicarboxylic acid with molten diamine.

4. The process of claim 1 wherein an aqueous salt solution is formed having a concentration of 80 to 85% by weight, said solution thereafter being heated to form nylon.

5. The process of claim 1, wherein the salt solution is employed for condensation without removing the heat of neutralization.

6. The process of claim 1, wherein said salt is hexamethylene diammonium adipate.

\* \* \* \* \*